(12) United States Patent
Wu et al.

(10) Patent No.: US 10,911,813 B1
(45) Date of Patent: Feb. 2, 2021

(54) PROVIDING METADATA FOR LIVE MEDIA STREAMS

(71) Applicant: Amazon Technologies, Inc., Seattle, WA (US)

(72) Inventors: Yongjun Wu, Bellevue, WA (US); Matthew Scharr, Portland, OR (US); Rakesh Tangirala, Redmond, WA (US); Amarsingh Buckthasingh Winston, Seattle, WA (US); Khawaja Salman Shams, Portland, OR (US); Matthew Brinkley, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 431 days.

(21) Appl. No.: 15/690,838

(22) Filed: Aug. 30, 2017

(51) Int. Cl.
| | |
|---|---|
| *H04N 21/2668* | (2011.01) |
| *H04N 21/2187* | (2011.01) |
| *H04N 21/81* | (2011.01) |
| *H04N 21/2347* | (2011.01) |
| *H04L 29/06* | (2006.01) |
| *H04N 21/235* | (2011.01) |
| *H04N 21/488* | (2011.01) |
| *H04N 21/258* | (2011.01) |

(52) U.S. Cl.
CPC ....... *H04N 21/2668* (2013.01); *H04L 65/608* (2013.01); *H04N 21/2187* (2013.01); *H04N 21/2347* (2013.01); *H04N 21/2353* (2013.01); *H04N 21/25808* (2013.01); *H04N 21/4884* (2013.01); *H04N 21/812* (2013.01); *H04N 21/8106* (2013.01)

(58) Field of Classification Search
CPC .................................................. H04N 21/2442
See application file for complete search history.

(56) References Cited

U.S. PATENT DOCUMENTS

| | | | | |
|---|---|---|---|---|
| 10,349,234 B1* | 7/2019 | Rivkin | .................... | H04W 4/12 |
| 2008/0235087 A1* | 9/2008 | Amento | ................ | G06Q 30/02 |
| | | | | 705/14.54 |
| 2009/0003796 A1* | 1/2009 | Borghesani | ............ | H04N 5/782 |
| | | | | 386/249 |
| 2010/0205049 A1* | 8/2010 | Long | ...................... | G06Q 30/02 |
| | | | | 705/14.5 |
| 2010/0287580 A1* | 11/2010 | Harding | ........... | H04N 21/23424 |
| | | | | 725/14 |
| 2012/0047542 A1* | 2/2012 | Lewis | .............. | H04N 21/44016 |
| | | | | 725/97 |
| 2013/0198328 A1* | 8/2013 | Green | ................. | H04L 65/4076 |
| | | | | 709/217 |
| 2014/0040026 A1* | 2/2014 | Swaminathan | ........ | G06Q 30/02 |
| | | | | 705/14.53 |
| 2014/0150019 A1* | 5/2014 | Ma | ...................... | G06Q 30/0251 |
| | | | | 725/34 |
| 2014/0316899 A1* | 10/2014 | McGowan | ......... | G06Q 30/0264 |
| | | | | 705/14.61 |
| 2015/0016800 A1* | 1/2015 | Bowers | .................. | G11B 27/28 |
| | | | | 386/241 |
| 2015/0058138 A1* | 2/2015 | Schler | ................ | G06Q 30/0275 |
| | | | | 705/14.71 |

(Continued)

*Primary Examiner* — Mushfikh I Alam
(74) *Attorney, Agent, or Firm* — Weaver Austin Villeneuve & Sampson LLP

(57) ABSTRACT

Techniques are described for providing metadata corresponding to primary content of live media streams that include secondary content inserted into the streams.

22 Claims, 3 Drawing Sheets

(56) References Cited

U.S. PATENT DOCUMENTS

| | | | |
|---|---|---|---|
| 2015/0188974 A1* | 7/2015 | Garcia-Mendoza Sanchez | G06F 16/2282 709/231 |
| 2015/0326945 A1* | 11/2015 | Johnson | H04N 21/812 725/32 |
| 2016/0088361 A1* | 3/2016 | Killick | H04N 21/812 725/32 |
| 2016/0127776 A1* | 5/2016 | Zilberstein | H04N 21/458 725/34 |
| 2016/0134945 A1* | 5/2016 | Gower | H04N 21/234345 725/88 |
| 2016/0198202 A1* | 7/2016 | Van Brandenburg | H04N 21/26258 725/31 |
| 2016/0205164 A1* | 7/2016 | Schmidt | H04L 1/0001 709/219 |
| 2017/0195744 A1* | 7/2017 | Engel | H04N 21/2187 |
| 2019/0058745 A1* | 2/2019 | Mocioiu | H04L 65/604 |
| 2019/0182516 A1* | 6/2019 | Li | H04N 21/23424 |

* cited by examiner

US 10,911,813 B1

PROVIDING METADATA FOR LIVE MEDIA STREAMS

BACKGROUND

Live streaming content includes channels or feeds with live broadcasts of media content (e.g., sporting events, news, etc.). Unlike video-on-demand (VOD) assets, live streaming content typically does not have a distinct end point and may continue indefinitely. It has become more common for a live content stream to have secondary content (e.g., advertisement content) inserted into the stream. However, the metadata of the live content can be different from the metadata of the secondary content. A challenge is presented when a request for the live content occurs during a period in the stream when the secondary content is scheduled for delivery, which may result in a client device not receiving the necessary metadata for proper playback.

DETAILED DESCRIPTION

This disclosure describes techniques for providing metadata (e.g., subtitles and content protection) for a live content stream that has secondary content dynamically inserted into the stream. In particular, providing primary live content metadata for when a client device requests playback at a point in the stream where advertisement content has been inserted. For more efficient delivery of the advertisement content, metadata for advertisement content is typically different from the live content. For example, live content might be encrypted while advertisement content is not, which means that manifest data for the live content must include content protection information to establish a secure playback session. In addition, content protection information is typically provided one time as part of manifest data sent in response to an initial request for playback. If a playback request occurs while an advertisement is scheduled for delivery, the response from the media server is not guaranteed to include the content protection information. Thus, according to the techniques described herein, manifest data is provided to a requesting client in ways that guarantee that any necessary metadata for the live content (e.g., content protection information or subtitle information) is included in the manifest data, allowing for a successful playback session even when the session begins during the advertisement content. An example may be instructive.

Figure 1:
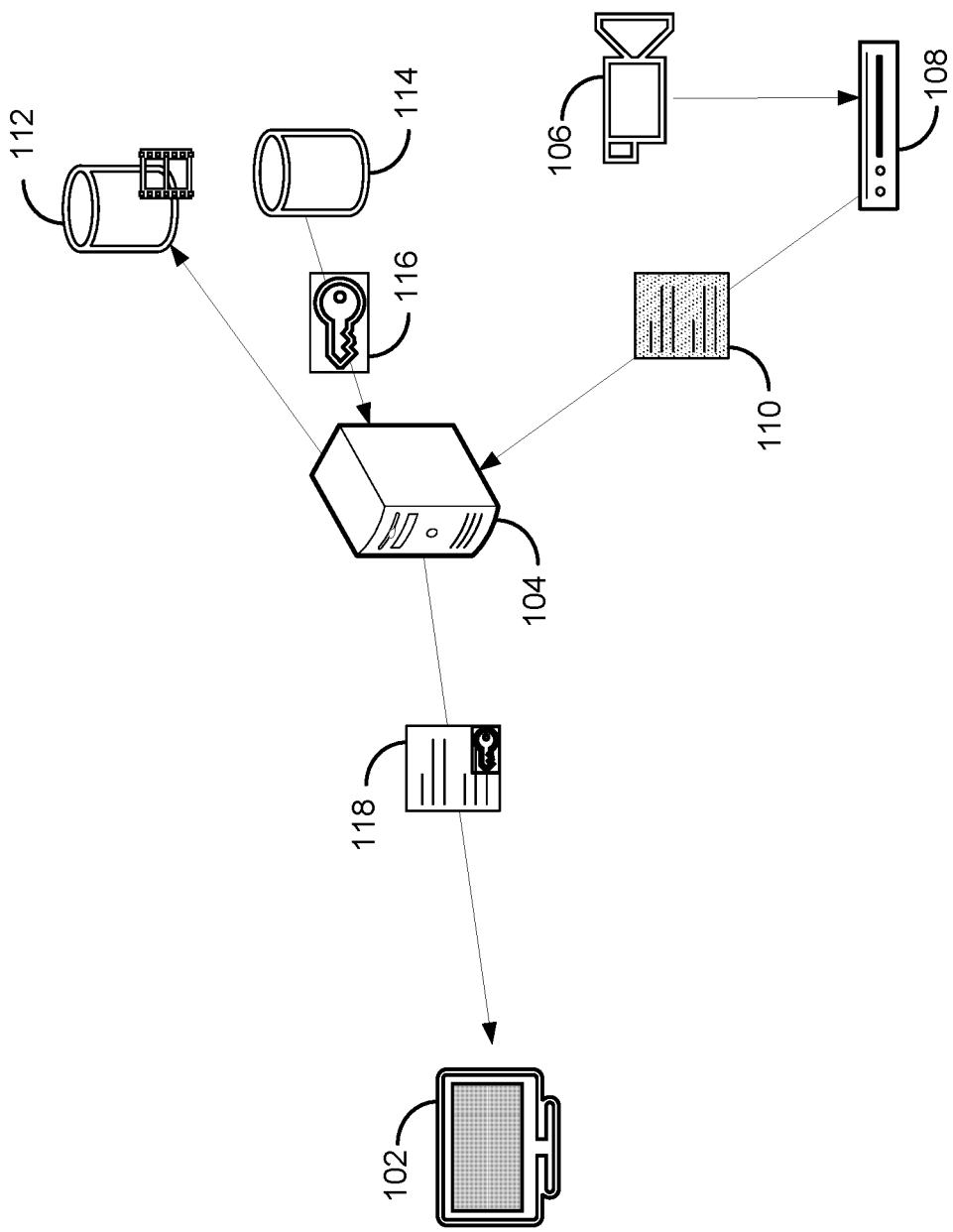
FIG. 1 illustrates an example of providing metadata for live media streams.

In FIG. 1, client device 102 sends a request for live media content (e.g., a live football game captured via live broadcast source 106) to media server 104. As media server 104 is receiving requests for content, it also receives root manifest data 110 generated by live encoder 108. Root manifest data 110 includes a sequence of locations (e.g., uniform resource locations (URLs)) pointing to live content fragments and/or placeholder references for targeted advertisement content to be inserted. In this example, client device 102 requests the live media content during a period designated for advertisement content. An advertisement exchange server provides advertisement content which might be personally tailored to the shopping habits of a user of client device 102, e.g., an advertisement for a tennis racket the user has been considering purchasing. Media server 104 identifies the locations of the targeted advertisement fragments stored in advertisement database 112 and generates dynamic manifest data 118 with the locations inserted in place of the placeholder references.

As mentioned above, client device 102 requests the live media content at a moment in the stream when an advertisement is to be delivered for playback. That is, at a moment for which initial manifest data provided to client device is not guaranteed to include playback metadata for the primary live content. Typically, only the metadata associated with the type of media content is included in manifest data provided to the client device. For example, if the initial manifest data received by client device 102 only included advertisement content, it would also only include metadata corresponding to the advertisement content. To address this issue and according to the techniques enabled by the present disclosure, metadata for the live media content is provided regardless of whether an initial playback request occurs during a period of live content or during a period of advertisement content. In FIG. 1, media server 104 requests metadata corresponding to the live media content from metadata database 114. Metadata can include subtitle information, content protection information, alternative audio information, etc. FIG. 1 shows media server 104 receiving content protection information 116 corresponding to the live media content requested by client device 102. As media server 104 is generating dynamic manifest data 118, it includes the content protection information 116. In this way, client device 102 receives content protection information that establishes an encrypted streaming session for secure playback of the live content. As will be described, there are a number of different ways in which this may be achieved.

Figure 2:
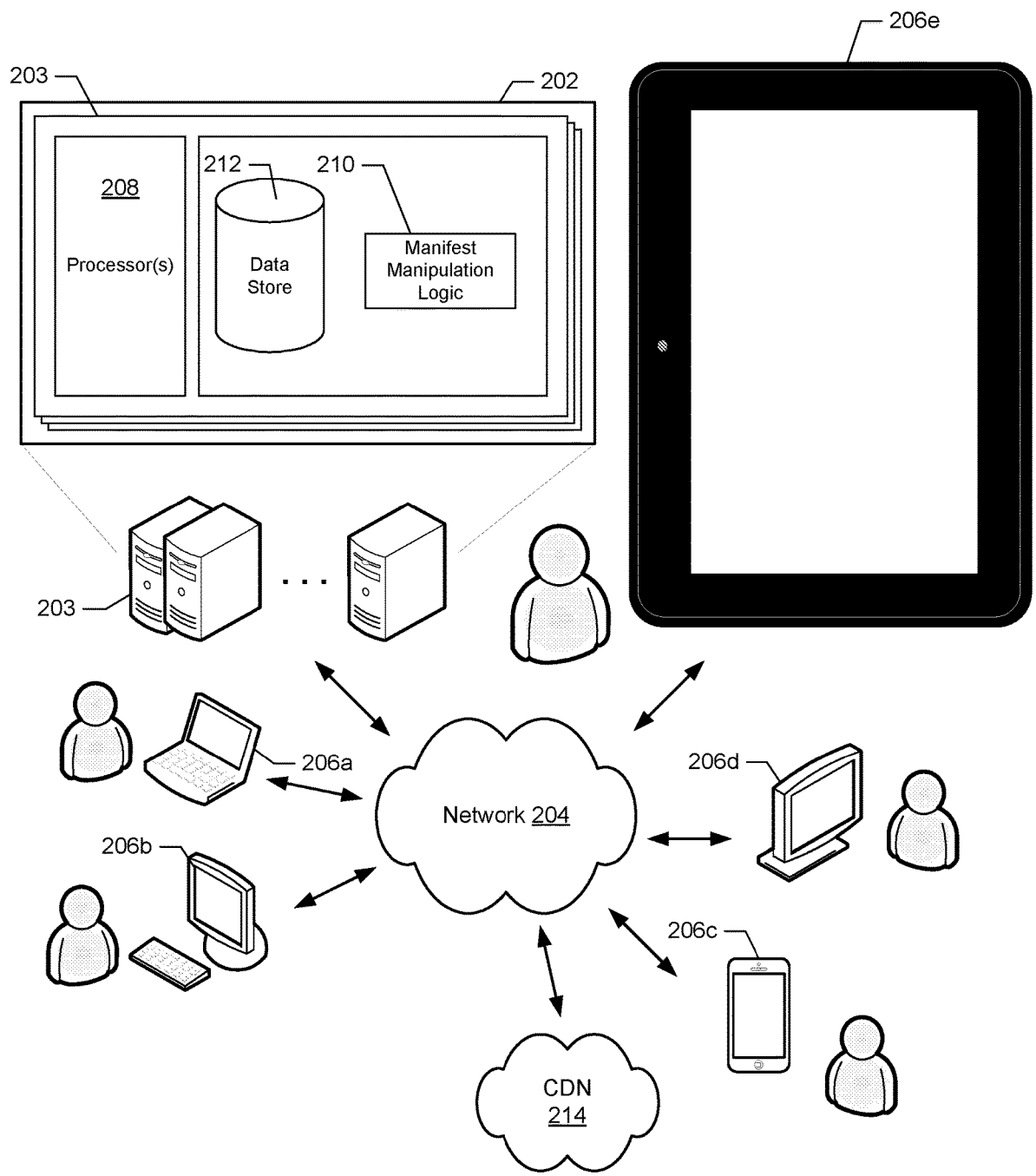
FIG. 2 is a simplified diagram of an example of a network computing environment in which various implementations may be practiced.

FIG. 2 illustrates an example of a computing environment in which a video content service 202 provides live streaming content and on-demand content (e.g., audio or video) via network 204 to a variety of client devices (206a-e) in accordance with the techniques described herein. Content service 202 may conform to any of a wide variety of architectures such as, for example, a services platform deployed at one or more co-locations, each implemented with one or more servers 203. Network 204 represents any subset or combination of a wide variety of network environments including, for example, HTTP networks, TCP/IP-based networks, telecommunications networks, wireless networks, satellite networks, cable networks, public networks, private networks, wide area networks, local area networks, the Internet, the World Wide Web, intranets, extranets, etc. Client devices 206a-e may be any suitable device capable of connecting to network 204 for streaming on-demand and live streaming content provided by service 202. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices (e.g., smart watches), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

Server 203 may be implemented by a variety of physical servers and/or virtual servers. In some implementations, server 203 is partitioned to have separate virtual servers configured to perform different functions. In one example, one virtual server identifies root manifest data and metadata, while a second virtual server generates and provides dynamic manifest data and fragments to client devices 206a-e. Server 203 includes logic configured to make decisions relating to generating dynamic manifest data as enabled by the present disclosure (e.g., as represented by manifest manipulation logic 210). For example, such logic might be configured to identify metadata for different live content streams and generate dynamic manifest data with targeted advertisement content for each of client devices 206a-e. Manifest manipulation logic 210 can also periodically identify and provide a refresh or update for live manifest data to clients currently streaming live content.

In addition to providing access to media content, server 203 may also store a variety of information related to the live streaming content (e.g., various types of metadata and manifest data in data store 212 to which service 202 provides access). Alternatively, such information about the media content, as well as the media content itself may be provided and/or hosted by one or more separate platforms or databases, e.g., CDN 214. It should be noted that while logic 210 and data store 212 are contemplated as integrated with server 203 of content service 202, implementations are also contemplated in which either or both operate remotely from the associated content service, and/or either or both are under the control of an independent entity. From these examples, those of skill in the art will understand the diversity of use cases to which the techniques described herein are applicable.

Client devices 206a-206e may include different types of media players configured according to a variety of standards and/or protocols such as HTTP Live Streaming (HLS), Dynamic Adaptive Streaming over HTTP (DASH), Microsoft Smooth Streaming, etc. each of which may receive different types of manifest data according to the type of media player. Client devices 206a-e can also include various types of logic, for instance, decoder logic for decoding the encoded media content received from edge server 204a and playback handling logic to request playback of portions of media content. In addition, client devices 206a-e include various types of memory to store and/or cache decoded media, one or more processors, and other hardware components to request and decode the encoded media content provided by server 203. For example, the processors of client devices 206a-e execute stored instructions in memory to implement decoding techniques based on the encoding techniques disclosed herein.

It should be noted that, despite references to particular computing paradigms and software tools herein, the computer program product and the computer program instructions on which various implementations disclosed herein are based may correspond to any of a wide variety of programming languages, software tools, and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

A specific implementation will now be described with reference to FIG. 1, the computing environment of FIG. 2, and the flow diagram of FIG. 3. To start streaming media content, a user selects media content for playback on a client device, for example, by selecting a live football game for from a video streaming service on their smart TV. The smart TV then sends a request (e.g., an HTTP request) for playback of the selected media content, and the request is received by a media server (302). Upon receiving the request of block 302, the media server identifies root manifest data corresponding to the live media content (304). For example, a media server identifies root manifest data for a live football game. Root manifest data includes a sequence of locations pointing to live content fragments and/or placeholder references for targeted advertisement content to be inserted. The root manifest data is provided to a media server periodically, such as when additional live content is recorded and encoded or when a period of advertisement content is scheduled for delivery. For example, first root manifest data is provided for a two-second fragment of a football game, while second root manifest data is provided for the next two-second fragment of the football game. Alternatively, root manifest data that is provided during a period of advertisement content may include a sequence of placeholder references for the next 30 seconds, which may be followed by further root manifest data for a fragment of the football game or for placeholder references for additional advertisement content.

The manner in which advertisement content is selected may vary. In some implementations, a media server identifies advertisement content corresponding to different device characteristics for client devices that do not support dynamic insertion of secondary content. In other implementations, a media server identifies advertisement content targeting a user of the third client device based on particular data about the user, e.g., personalized browsing habits, past purchases, demographics, etc.

Returning to FIG. 3, metadata corresponding to the live content is identified (306). The metadata is included with manifest data provided to a client device in order to allow for proper playback of media content. Metadata includes subtitle information, content protection information, and/or alternative audio information. Subtitle information refers subtitles and the information for enabling or disabling the display of subtitle text. Subtitles include text that is synchronized for display with associated audio content and video content. Subtitles may be used for various purposes such as translation or for users with impaired hearing.

Content protection information is used for establishing secure streaming sessions. The information includes encryption methods and key mapping methods (e.g., Common Encryption Scheme (CENC)) for DRM system such as Google's Widevine, Microsoft's PlayReady, Apple's FairPlay, Marlin, *Latens*, Adobe Primetime, etc. Live streaming content is typically delivered in an encrypted stream using any of a variety of encryption technologies including, for example, various Advanced Encryption Standard (AES) and Elliptic Curve Cryptography (ECC) encryption techniques. It should be noted that the techniques described herein are compatible with a wide range of content services, media players, DRM systems, and encryption technologies, the details of which are known to those of skill in the art. The nature and operation of these technologies will therefore not be described in detail to promote clarity.

Alternative audio information allows users to select different languages to listen to while viewing live content, for instance, through a drop down menu of the media player. As an illustration, one live content stream may include options to select between English, Spanish, and German, whereas another live content stream includes options to select only between English and Spanish.

Figure 3:
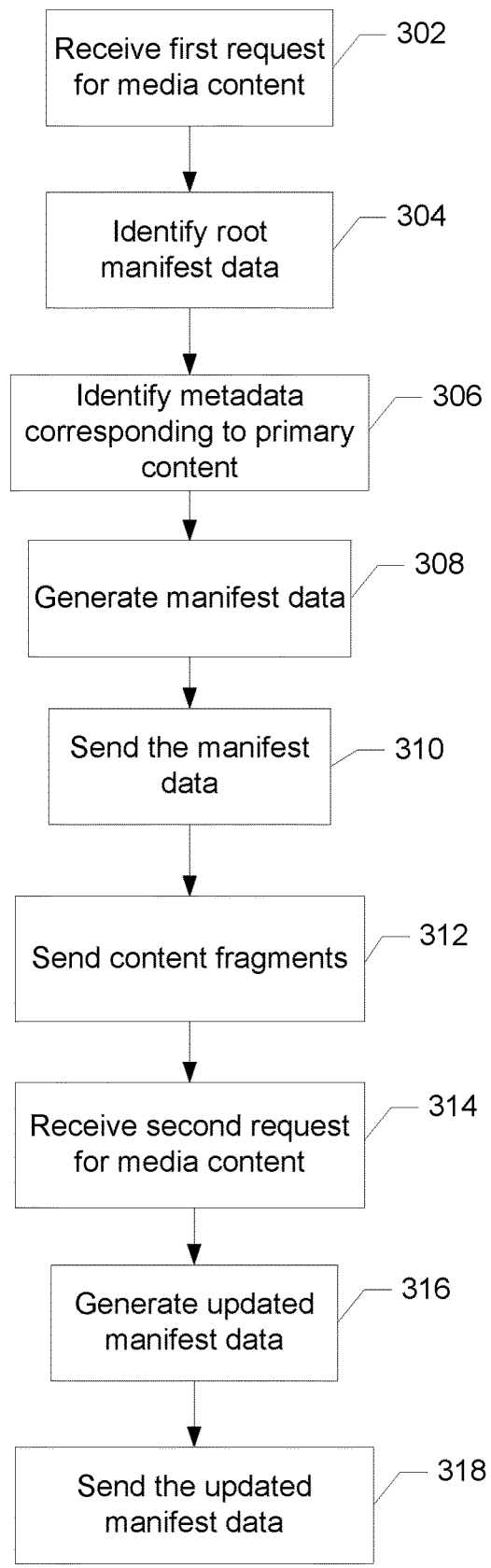
FIG. 3 is a flowchart illustrating operation of a particular implementation.

In some implementations, block 306 of FIG. 3 includes a determination of whether that the root manifest data identified in block 304 only includes references to advertisement content. One simple example is if a playback request occurs during a period of live content. In this case, the root manifest data would include fragments of live content, and as such, would not need the live content metadata identified for proper playback. In another example, if a user requests playback during a period of scheduled advertisement content, then the root manifest data will include only references to advertisement content. However, there are situations where root manifest data might include references to advertisement content and live content fragments (e.g., if a user request occurs at the end of an advertisement and the live content is resuming). In such cases, the metadata for the primary content would not need to be identified since a portion of the client manifest data would have at least some live content.

As mentioned above, the metadata for live content may be different from the metadata of the advertisement content. In some cases, the live content and advertisement content do not have any metadata in common, and as such, all the metadata corresponding to the live content would be identified. Alternatively, even if the live content and metadata do not have any metadata in common, only certain metadata that is necessary for proper playback is identified (e.g., subtitle information and/or content protection information). In other cases, the live content and advertisement content have some metadata in common, which can be used to avoid redundant inclusion of metadata when generating manifest data.

Returning to FIG. 3, manifest data is generated based on the advertisement content and the metadata for the live content (308). For example, the manifest data includes URLs for fragments of a tennis racket advertisement and metadata for a live basketball game. Different techniques may be used to include the metadata for the live content in the manifest data for the advertisement content.

In some implementations, a media server inserts a custom event using an event element in adherence to the DASH standard. In such implementations, the media player is configured to parse the custom event and process the metadata in the custom event in a similar manner as receiving the metadata through a standard live content manifest. An event can be configured such that standard tags and syntax for the live content metadata can be used while encapsulated within a custom event. As one illustration using alternative audio information, the custom event is: "<event><video src="mp4:audio_eng.mp4" title="English"><param name="audioOnly" value="TRUE" valuetype="data"/></video> <video src="mp4:audio_de.mp4" title="Deutsch"><param name="audioOnly" value="TRUE" valuetype="data"/></video></event>." In other implementations, standard syntaxes and tags are adopted by a standard such as DASH to implement similar functionality as part of an updated revision of the standard.

In other implementations, a media server inserts the live content metadata into the manifest data using the standard syntax ("ContentProtection") even though the advertisement content does not match the type of metadata specified. For example, if the advertisement content does is not encrypted, the content protection information may be inserted into manifest data for the advertisement content. Below is an example of content protection information that may be used in manifest data for advertisement content:

<!--Common Encryption-->
      <ContentProtection cenc:default KID="1239G4A-C6261-41251-BFF22F6-E944D6BEF1F6"schemeIdUri="urn:mpeg:dash:mp4protection:2011" value="cenc">
      </ContentProtection>
    <!--Marlin-->
      <ContentProtection schemeIdUri="urn:uuid:123BFE-123BFE-123BFE-123BFE-123BFE123BFE">
      </ContentProtection>
    <!--PlayReady-->
      <ContentProtection schemeIdUri="urn:uuid: 123BFE-123BFE-123BFE-123BFE-123BFE 123BFE" value="MSPR 2.0">

While the approach above will allow for media players to receive and process the metadata for live content, it is not preferable because it does not adhere to the various industry standards.

Implementations are also contemplated in which primary content metadata is provided in a manner that does not involve inserting live content metadata into manifest data only for advertisement content. For example, standard manifest data can be configured with a long enough duration to ensure that live content is always included in some of the manifest data when it is requested. For example, if the longest block of advertisement content is scheduled to be 4 minutes and 30 seconds, then the manifest data can be configured with a duration of 5 minutes. As long as a portion of live content is included in the manifest data (~30 seconds), then the media player will receive the live content metadata in a format that adheres to the proper standards. However, if an advertisement period exceeds the 5 minute duration, then the personalized advertisement content will not be inserted. In some implementations, a media server maintains a shorter version of the manifest data and a longer version of the manifest data. The media server can determine whether or not to provide the shorter version of the manifest data or a longer version of the manifest data depending on when a playback request is received. For example, if a media server receives a request for playback during a period of advertisement content, then the media server will provide the longer duration manifest data. In some other implementations, the duration of the manifest data is determined automatically such that the duration of the manifest data is guaranteed to exceed the duration of the longest period of secondary content. The duration can be determined using historical analysis of past periods of advertisement content to determine a sufficient duration. For example, the media server may access average historical durations for past sports games globally, or based on any applicable subset of sports games. For example, the system may access average historical durations for all sports games in the same geographic area as the user, all football games in the United States, etc.

In some cases, the duration of the manifest data can be dynamically adjusted so that the manifest data does not only include secondary content. Upon receiving a request for playback during a period of advertisement content, the media server can determine whether manifest data that is configured with a set duration (e.g., 5 minutes) only includes references to advertisement. The media server can maintain historical portions (e.g., 30 second increments of manifest data preceding the end of the standard manifest data) of the manifest data that can be incrementally added to the manifest data until the manifest data includes primary live content. In the situation where the manifest data only includes advertisement content, the media server continues to add historical portions of the manifest data until the manifest data includes primary live content. For example, if the advertisement content period is 5 minutes and 55 seconds, then the media server can include two 30 second historical portions such that five seconds of primary live content is included in a 6 minute manifest to a client device.

In another implementation, a sideband communication service is used to send metadata to the media player before a streaming session is established. For example, when a client device requests playback of the live content, the request is routed to a separate service that allows a content service provider to provide information to the client device outside of the constraints of a standard. The sideband communication service uses different rules configured by an administrator to provide metadata accordingly. For example, one rule may be configured to determine that the client device is requesting live content during a period when advertisement content has been inserted. The sideband communication service will then provide the metadata for the live content. Alternatively, the sideband communication service uses a rule that always provides metadata associated with the live content when a user requests playback even if the request is made during a period of live content. In other implementations, the sideband communication service uses a rule that provides the manifest data with a total duration of that exceeds the longest duration of the secondary content such that manifest data includes playback options for the primary live content as well. This rule can be configured to trigger when the client device requests playback during a period of advertisement content.

Returning to FIG. 3, the manifest data is provided to the client device of block 302 (310). Requests for fragments are received using the manifest data, and the requested fragments are provided to the client device (312). As a client device's buffer dwindles, or as new fragments are encoded and available for request, periodic update, or refresh, requests are sent and received by the media server (314). Updated manifest data is generated (316) and provided to the client device (318).

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A system, comprising one or more computing devices configured to:
   receive an initial request for live content from a client device, the live content including primary content and advertisement content, the initial request coinciding with a portion of the live content corresponding to the advertisement content, and the initial request conforming to the Dynamic Adaptive Streaming over HTTP (DASH) standard;
   identify content protection metadata conforming to the DASH standard and associated with the primary content that is not associated with the advertisement content;
   identify root manifest data corresponding to the live content, the root manifest data being configured for use in generating client manifest data;
   determine that the root manifest data includes references to only the advertisement content, wherein the root manifest data includes references to only the advertisement content as a result of the initial request coinciding with the portion of the live content;
   generate the client manifest data representing playback options associated with the advertisement content, the client manifest data including the content protection metadata associated with the primary content; and
   provide the client manifest data to the client device.

2. The system of claim 1, wherein the client manifest data further includes subtitle information associated with the primary content or alternative audio information associated with the primary content.

3. The system of claim 1, wherein the content protection metadata associated with the live content is included in the client manifest data as a custom event.

4. The system of claim 1, wherein the client manifest data conforms to the DASH standard.

5. A system, comprising one or more computing devices configured to:
   receive an initial request for media content from a client device, the media content including primary content and secondary content and the initial request coinciding with a portion of the live content corresponding to the secondary content;
   generate manifest data representing playback options for only the secondary content, wherein the manifest data represents playback options for only the secondary content as a result of the initial request coinciding with the portion of the live content;
   provide the manifest data to the client device; and
   provide metadata associated with the primary content to the client device in connection with providing the manifest data to the client device, the metadata being for use by the client device in configuring playback of the primary content.

6. The system of claim 5, wherein the metadata includes subtitle information, content protection information, or alternative audio information.

7. The system of claim 5, wherein the one or more computing devices are configured to provide the metadata associated with the primary content by including the metadata in the manifest data.

8. The system of claim 5, wherein the metadata corresponding to the media content is included in the manifest data as a custom event.

9. The system of claim 5, wherein the one or more computing devices are further configured to identify root manifest data corresponding to the media content in response to receiving the initial request for the media content and determine that the root manifest data includes references to only the secondary content.

10. The system of claim 5, wherein the primary content represents live content and the secondary content represents advertisement content.

11. A method, comprising:
    receiving an initial request for media content from a client device, the media content including primary content and secondary content and the initial request coinciding with a portion of the live content corresponding to the secondary content;
    generating manifest data representing playback options for only the secondary content, wherein the manifest data represents playback options for only the secondary content as a result of the initial request coinciding with the portion of the live content;
    providing the manifest data to the client device; and
    providing metadata associated with the primary content to the client device in connection with providing the manifest data to the client device, the metadata being for use by the client device in configuring playback of the primary content.

12. The method of claim 11, wherein the metadata includes subtitle information, content protection information, or alternative audio information.

13. The method of claim 11, wherein the metadata is provided by including the metadata in the manifest data.

14. The method of claim 11, wherein the metadata corresponding to the media content is included in the manifest data as a custom event.

15. The method of claim 11, further comprising identifying root manifest data corresponding to the media content in response to receiving the initial request for the media content and determining that the root manifest data includes references to only the secondary content.

16. The method of claim 11, wherein the primary content represents live content and the secondary content represents advertisement content.

17. A system, comprising one or more computing devices configured to:
    receive an initial request for media content from a client device, the media content including primary content and secondary content;
    generate manifest data representing playback options for a given duration of the media content, wherein the given duration is longer than a longest block of the secondary content such that playback options for the primary content are guaranteed to be included in the manifest data; and
    provide the manifest data to the client device.

18. The system of claim 17, where the one or more computing devices are configured to generate the manifest data using historical secondary content period information representing an average of past durations of secondary content.

19. The system of claim 17, wherein the one or more computing devices are configured to generate the manifest data by including historical portions of manifest data such that a duration of the manifest data exceeds the longest duration of the secondary content after including the historical portions of manifest data.

20. The system of claim 19, wherein the one or more computing devices are configured to identify root manifest data corresponding to the media content in response to receiving the initial request for the media content and determining that the root manifest data includes references to only the secondary content.

21. The system of claim 5, wherein the one or more computing devices are configured to provide the metadata associated with the primary content by using a sideband communication service.

22. The method of claim 11, wherein the metadata is provided by using a sideband communication service.

* * * * *